United States Patent
Wang et al.

(10) Patent No.: US 10,192,097 B2
(45) Date of Patent: Jan. 29, 2019

(54) FINGER PRINT DETECTION APPARATUS AND DETECTION METHOD THEREOF

(71) Applicant: Novatek Microelectronics Corp., Hsinchu (TW)

(72) Inventors: Shun-Li Wang, Hsinchu (TW); Ching-Ho Hung, Hsinchu (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 15/133,240

(22) Filed: Apr. 20, 2016

(65) Prior Publication Data
US 2017/0308735 A1 Oct. 26, 2017

(51) Int. Cl.
G06K 9/00 (2006.01)
G06K 9/38 (2006.01)
G06K 9/46 (2006.01)

(52) U.S. Cl.
CPC .......... G06K 9/00067 (2013.01); G06K 9/38 (2013.01); G06K 9/4647 (2013.01)

(58) Field of Classification Search
None
See application file for complete search history.

(56) References Cited

U.S. PATENT DOCUMENTS

| | | | | |
|---|---|---|---|---|
| 5,067,162 A * | 11/1991 | Driscoll, Jr. | ........ | G06K 9/00067 382/126 |
| 7,031,501 B2 * | 4/2006 | Adachi | ............. | G06K 9/00087 382/124 |
| 7,058,238 B2 * | 6/2006 | Lei | ............. | G06K 9/00013 348/222.1 |
| 7,127,123 B2 * | 10/2006 | Wredenhagen | ....... | H04N 1/4074 382/169 |
| 7,697,733 B2 * | 4/2010 | Yumoto | ............... | G06K 9/6203 382/115 |
| 7,773,776 B2 * | 8/2010 | Adachi | ............. | H04N 1/40062 358/2.1 |
| 7,965,874 B2 * | 6/2011 | Abiko | ................. | G06K 9/0002 382/116 |
| 8,355,546 B2 * | 1/2013 | Kuo | .................... | G06K 9/0008 382/124 |
| 2001/0005221 A1 * | 6/2001 | Huang | ............... | G06K 9/00013 348/222.1 |
| 2002/0006233 A1 * | 1/2002 | Adachi | ............. | G06K 9/00087 382/289 |
| 2002/0030359 A1 * | 3/2002 | Bergenek | ................ | G06F 21/32 283/68 |

(Continued)

FOREIGN PATENT DOCUMENTS

TW 201541364 11/2015

*Primary Examiner* — Feng Niu
(74) *Attorney, Agent, or Firm* — JCIPRNET

(57) ABSTRACT

The finger print detection method includes: accessing a part of an input image to generate a checked image; setting a gray level range, wherein each of a gray level of the gray level rang is larger than a minimum gray level and smaller than a maximum gray level; obtaining a detected pixel number of the checked image corresponding to all of the gray levels within the gray level range; and, checking whether the detected pixel number is larger than a product value of a preset ratio and a total pixel number of the checked image or not to determine whether the checked image is a finger print or not.

16 Claims, 7 Drawing Sheets

(56) References Cited

U.S. PATENT DOCUMENTS

| | | | |
|---|---|---|---|
| 2003/0117654 A1* | 6/2003 | Wredenhagen | H04N 1/4074 358/3.21 |
| 2005/0220327 A1* | 10/2005 | Itoh | G06K 9/00087 382/124 |
| 2006/0056700 A1* | 3/2006 | Abiko | G06K 9/0002 382/190 |
| 2006/0165285 A1* | 7/2006 | Adachi | H04N 1/40062 382/173 |
| 2007/0047777 A1* | 3/2007 | Adachi | G06K 9/00087 382/124 |
| 2007/0071291 A1* | 3/2007 | Yumoto | G06F 3/03547 382/124 |
| 2007/0071359 A1* | 3/2007 | Yumoto | G06K 9/6203 382/284 |
| 2011/0096962 A1* | 4/2011 | Kuo | G06K 9/0008 382/124 |

* cited by examiner

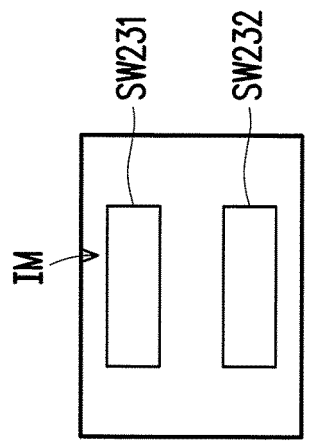
FIG. 2C
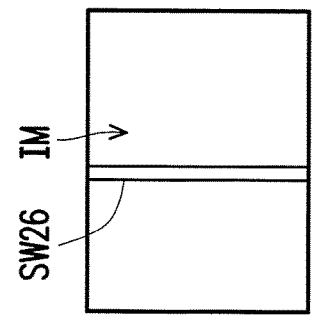
FIG. 2F
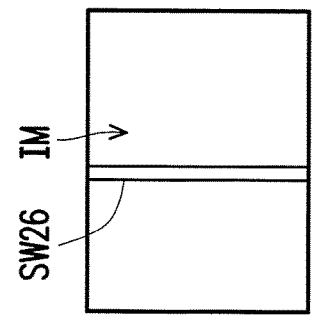
FIG. 2B
FIG. 2E
FIG. 2A
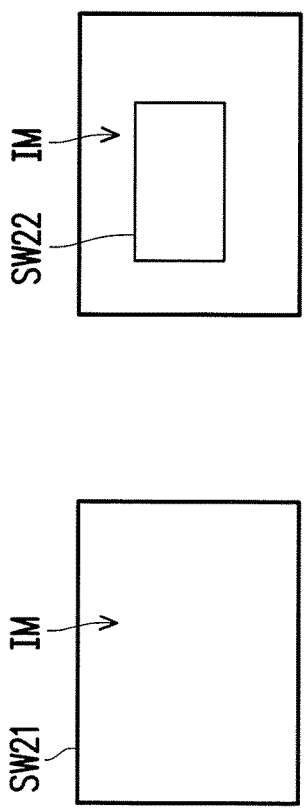
FIG. 2D
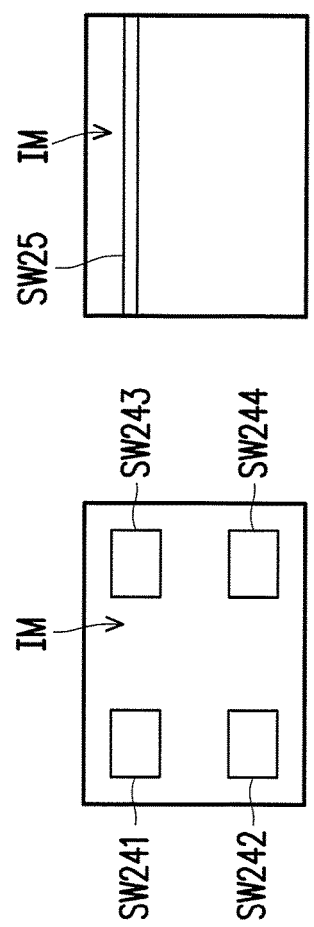

FINGER PRINT DETECTION APPARATUS AND DETECTION METHOD THEREOF

BACKGROUND

Field of the Invention

The invention is directed to a finger print detection apparatus and a detection method and more particularly, to a finger print detection apparatus with simplified circuit.

Description of Related Art

In recently years, electronic apparatus are more important for human's life. For security consideration, a finger printer identification scheme is used in electronic apparatus in nowadays.

In conventional art, for identifying a finger printer of a user, a powerful processor or a circuit with complex structure is always necessary. That is, a power consumption and prim cost of the electronic apparatus are increased for implementing the finger printer identification scheme. Such as that, it is an important course for a designer to simplify the circuit of a finger printer detection apparatus.

SUMMARY

The invention provides a finger print detection apparatus and a detection method for detecting a finger print with low power consumption.

The invention is directed to the finger print detection method including: accessing a part of an input image to generate a checked image; setting a gray level range, wherein each of a gray level of the gray level rang is larger than a minimum gray level and smaller than a maximum gray level; obtaining a detected pixel number of the checked image corresponding to all of the gay levels within the gray level range; and, checking whether the detected pixel number is larger than a product value of a preset ratio and a total pixel number of the checked image or not to determine whether the checked image is a finger print or not.

In an embodiment of the invention, wherein step of the obtaining the detected pixel number of the checked image corresponding to all of the gray levels within the gray level range included: obtaining a histogram of a plurality of pixel numbers of the checked image corresponding to the gray levels; selecting the pixel numbers corresponding to the gray levels within the gray level range to generate a plurality of selected pixel numbers; and summing the selected pixel numbers to generate the detected pixel number.

In an embodiment of the invention, the finger print detection method further includes: sensing an image to obtain the input image, and setting a scan area on the image, and obtaining the checked image according to the scan area.

In an embodiment of the invention, wherein a size of the scan area is not larger than a size of the input image.

In an embodiment of the invention, wherein the scan area includes at least one scan window.

In an embodiment of the invention, wherein step of checking whether the detected pixel number is larger than the product value of the preset ration and the total pixel number of the checked image or not to determine whether the checked image is the finger print or not includes: determining the checked image is the finger printer if the detected pixel number is larger than the product value; and determining the checked image is not the finger printer if the detected pixel number is not larger than the product value.

In an embodiment of the invention, the finger print detection method further includes: setting a flag if the checked image is determined to be the finger printer; and activating an operation for accessing an entire finger print by processing the input image.

In an embodiment of the invention, wherein step of setting the gray level range includes: setting an upper threshold value, wherein the maximum gray level>the upper threshold value>the minimum gray level; and setting a lower threshold value, wherein the maximum gray level>the upper threshold value>the lower threshold value>the minimum gray level.

In an embodiment of the invention, wherein the preset ratio equals to 1/2.

The invention is directed to the finger print detection apparatus including a detected pixel number generator, a reference value generator, and a first comparator. The detected pixel number generator accesses a part of an input image to generate a checked image and receives a gray level range, and obtains a detected pixel number of the checked image corresponding to all of the gray levels within the gray level range, wherein each of a gray level of the gray level rang is larger than a minimum gray level and smaller than a maximum gray level. The reference value generator generates a reference value by multiplying a preset ratio and a total pixel number of the checked image. The first comparator is coupled to the detected pixel number generator and the reference value generator. The first comparator compares the detected pixel number and the reference value to determine whether the checked image is a finger print or not.

To sum up, the finger print detection method of present disclosure determines whether the input image is a finger print or not by checking a part of the input image (the checked image). In present disclosure, an entire finger print is accessed according to the input image only when the check image is determined to be the finger print. Such as that, the power consumption for the finger print detection can be saved.

In order to make the aforementioned and other features and advantages of the invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2A-FIG. 2F respectively illustrate a plurality of diagrams for generating the checked images according to an embodiment of present disclosure.

DESCRIPTION OF EMBODIMENTS

Figure 1:
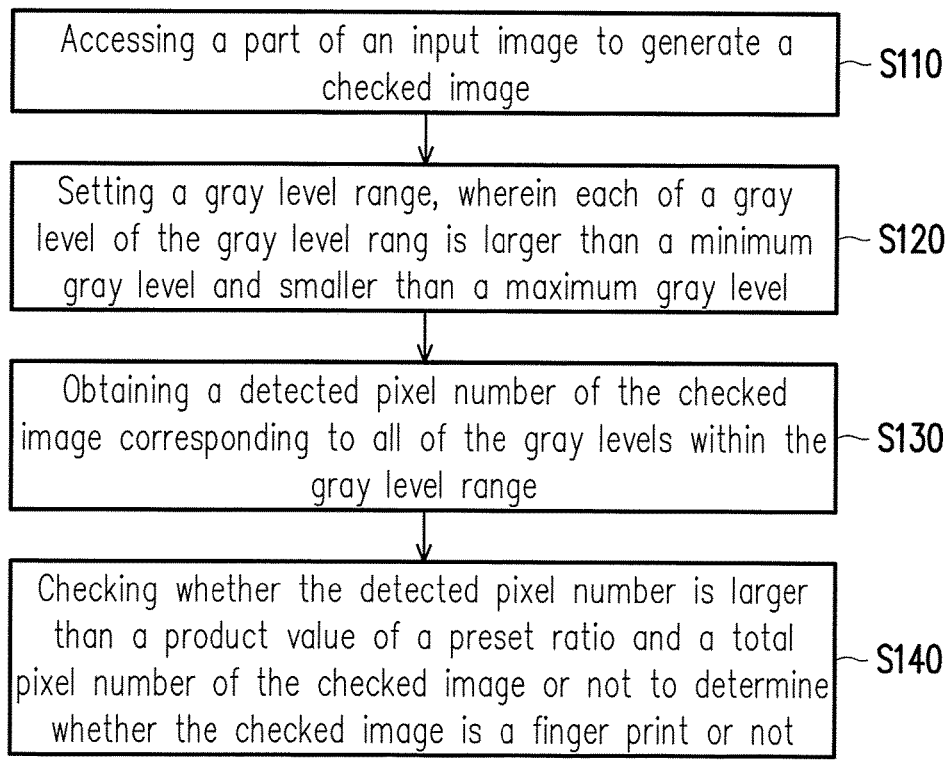
FIG. 1 illustrates a flow chart of a finger print detection method according to an embodiment of present disclosure.

Please refer to FIG. 1, FIG. 1 illustrates a flow chart of a finger print detection method according to an embodiment of present disclosure. In a step S110 of present disclosure, a check image is generated by accessing a part of an input image. In detail, a scan rang can be set, and the checked image may be obtained by scan the input image according to the scan range. Please refer to FIG. 2A-FIG. 2F here, wherein FIG. 2A-FIG. 2F respectively illustrate a plurality of diagrams for generating the checked images according to an embodiment of present disclosure. In FIG. 2A, the scan range is set by a scan window SW21, and a size of a scan window S21 equals to a size of the input image IM. Entire of the input image IM is scanned to generate the checked image according to the scan window S21. That is, a size of the checked image equals to the size of the input image IM. In FIG. 2B, the scan area is set by a scan window SW22. A size of the scan window S22 is smaller than the size of the input image IM, and a part of the input image IM is scanned according to the scan window S22 for generating the checked image. That is, a size of the checked image is smaller than the size of the input image IM. In additional, a position of the scan window SW22 is not limited in present disclosure. The scan window SW22 may be placed on middle or side of the input image IM, and the position of the scan window SW22 may be determined by a designer of an apparatus for executing the finger print detection method. In FIG. 2C, the scan area is composed by scan windows SW231 and SW232. The scan windows SW231 and SW232 are isolated to each other, and sizes of the scan windows SW231 and SW232 respectively may be different or the same. A total size of the scan windows SW231 and SW232 is smaller than the size of the input image IM.

In FIG. 2D, the scan area is composed by scan windows SW241, SW242, SW243 and SW244. The scan windows SW241, SW242, SW243 and SW244 may be placed on the input image IM in a 2×2 array. A total size of the scan windows SW241-SW244 is smaller than the size of the input image IM. In FIG. 2E, the scan area is composed by a scan window SW25, and the scan window SW25 may be formed by one or more display line(s) of the input image IM. A total size of the scan windows SW25 is smaller than the size of the input image IM. In FIG. 2F, the scan area is composed by a scan window SW26, and the scan window SW26 may be formed by one or more display column(s) of the input image IM. A total size of the scan windows SW26 is smaller than the size of the input image IM.

Of course, the scan area can also be set by combining at least two of the scan windows in FIG. 2B-FIG. 2F. Also, a shape of the scan windows in FIG. 2B-FIG. 2D are rectangle, and in some embodiments, the shape of each of the scan windows in FIG. 2B-FIG. 2D may be square, circle, oval, or any other polygon. Furthermore, the scan windows in a scan area may respectively have different shapes.

Figure 3A:
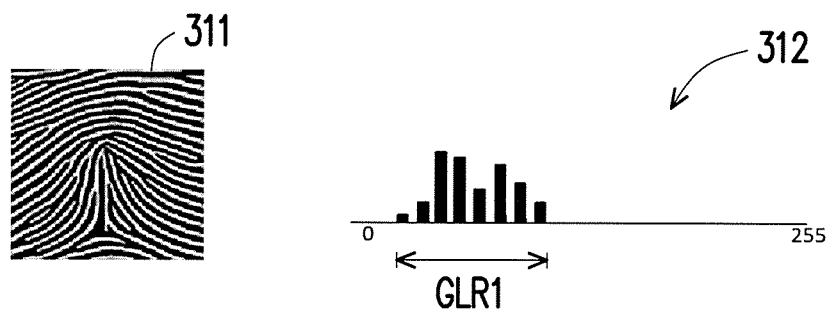
FIG. 3A-FIG. 3E respectively illustrate a plurality configurations of the checked image and corresponding histograms according to an embodiment of present disclosure.
Figure 3B:
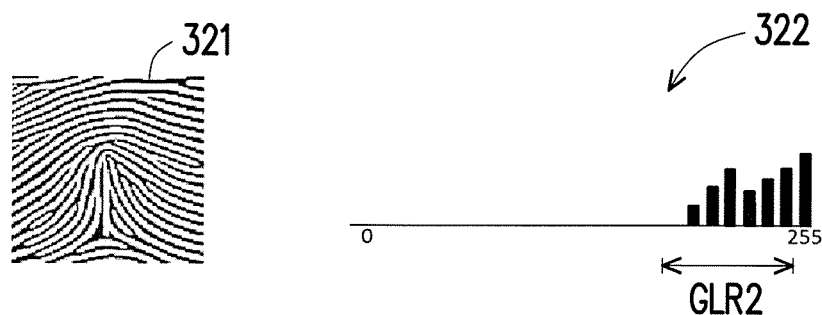

Please refer to FIG. 1 again, in the step S120, a gray level range is setting, wherein each of a gray level of the gray level rang is larger than a minimum gray level and smaller than a maximum gray level. Please be noted here, in a finger print detection application, there are many possible configurations of the checked image can be obtained. Please refer to FIG. 3A-FIG. 3E, wherein FIG. 3A-FIG. 3E respectively illustrate a plurality configurations of the checked image and corresponding histograms according to an embodiment of present disclosure. In FIG. 3A and FIG. 3B, checked images 311 and 321 are obtained respectively corresponding to a strong pressed finger and a weak pressed finger, and histograms 312 and 322 of pixel numbers of the checked images 311 and 321 corresponding to the gray levels can be obtained. The checked image 311 is an effective finger print. It can be seen by the histogram 312, a large number of the pixels of the checked image 311 are detected in a small gray level range GLR1. Furthermore, the checked image 312 is also an effective finger print. It can be seen by the histogram 322, a large number of the pixels of the checked image 322 are detected in a large gray level range GLR2.

Figure 3C:
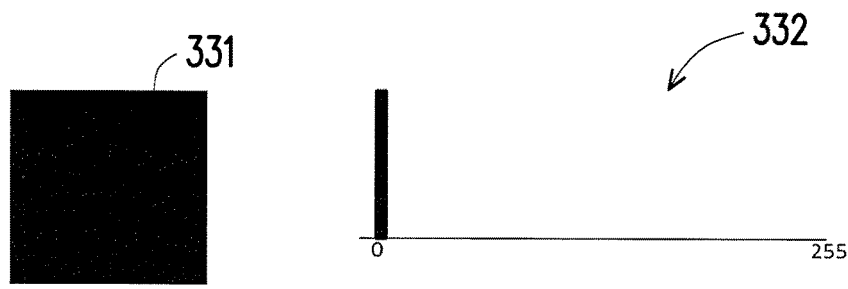
Figure 3D:
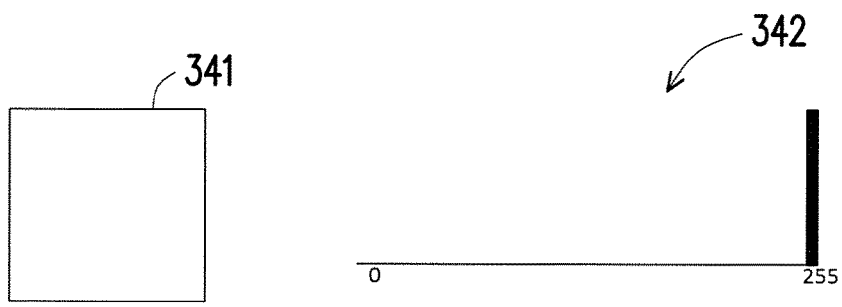
Figure 3E:
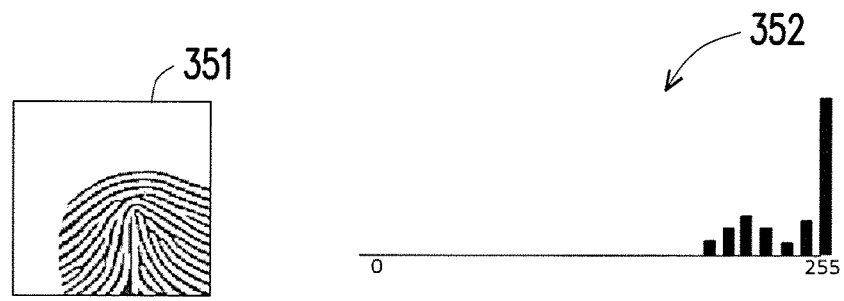

On the other hand, in FIG. 3C to FIG. 3E, checked images 331 to 341 are obtained respectively corresponding to a plurality of non-finger pressed conditions, and histograms 332 to 352 of pixel numbers of the checked images 331 to 351 corresponding to the gray levels can be obtained. In FIG. 3C, the checked image 331 is a black image, and all of the pixels of the checked images 331 are at gray level 0 (the minimum gray level) in the histograms 332. And in FIG. 3D, the checked image 341 is a white image, and all of the pixels of the checked images 331 are at gray level 255 (the maximum gray level) in the histograms 342. Besides, in FIG. 3E, the checked image 331 is obtained corresponding to an incompletely pressed finger, and a large number of pixels are at gray level 255, and a small number of pixels are smaller than gray level 255 in the histograms 352. The checked images 331-351 are not effective finger prints, and the pixels of the checked images 331-351 are not gathered in a certain gray level range.

For the configurations of the checked image mentioned above, the gray level range is set for determining whether the checked image is the effective finger print or not. Wherein, the gray level range is set above the minimum gray level (gray level 0) and beyond the maximum gray level (gray level 255).

Figure 4:
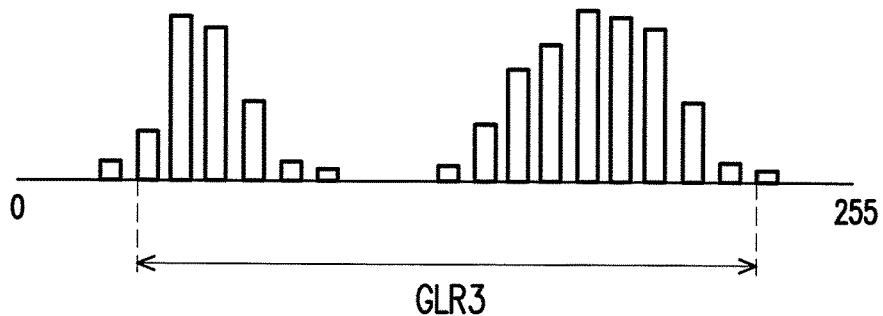
FIG. 4 illustrates a histogram of a plurality of pixel numbers of the checked image corresponding to the gray levels according to an embodiment of present disclosure.

Please refer to FIG. 1 again, after the step S120, in a step S130, a detected pixel number of the checked image corresponding to all of the gray levels within the gray level range is obtained. Then, whether the checked image is a finger print or not can be determined by checking whether the detected pixel number is larger than a product value of a preset ratio and a total pixel number of the checked image or not in a step S140. Please refer to FIG. 4, FIG. 4 illustrates a histogram of a plurality of pixel numbers of the checked image corresponding to the gray levels according to an embodiment of present disclosure. In FIG. 4, the histogram 410 corresponding to a checked image may be obtained, and a gray level range GLR3 is set. By selecting the pixel numbers corresponding to the gray levels within the gray level range GLR3 to be selected pixel numbers, and the detected pixel number of the checked image corresponding to all of the gray levels within the gray level range can be obtained by summing the selected pixel numbers. Further, the detected pixel number may be compared with a reference value. Wherein, the reference value may be generated by multiplying a preset ratio and a total pixel number of the checked image, and in the embodiment of present disclosure, the reference value is a product value of the total pixel number and the preset ratio. If the detected pixel number is larger than the reference value, the checked image can be determined to be a finger print. On the contrary, if the detected pixel number is not larger than the reference value, the checked image can be determined to be not the finger print.

Whether the checked image is the effective finger print or not is determined by a gathering situation of gray levels of pixels in the checked image. If a large number of the pixels are at the maximum gray level and/or the minimum gray level, the checked image is not the effective finger print. Besides, if the large number of the pixels are gathered within the gray level range GLR3, the checked image is the effective finger print. Wherein, the large number is determined by the preset ratio of the total pixel number of the checked image. In this embodiment, the gray level range GLR3 and the preset ratio may be set by a designer for a finger detection apparatus, and in some embodiment, the preset ratio may equal to 1/2.

Figure 5:
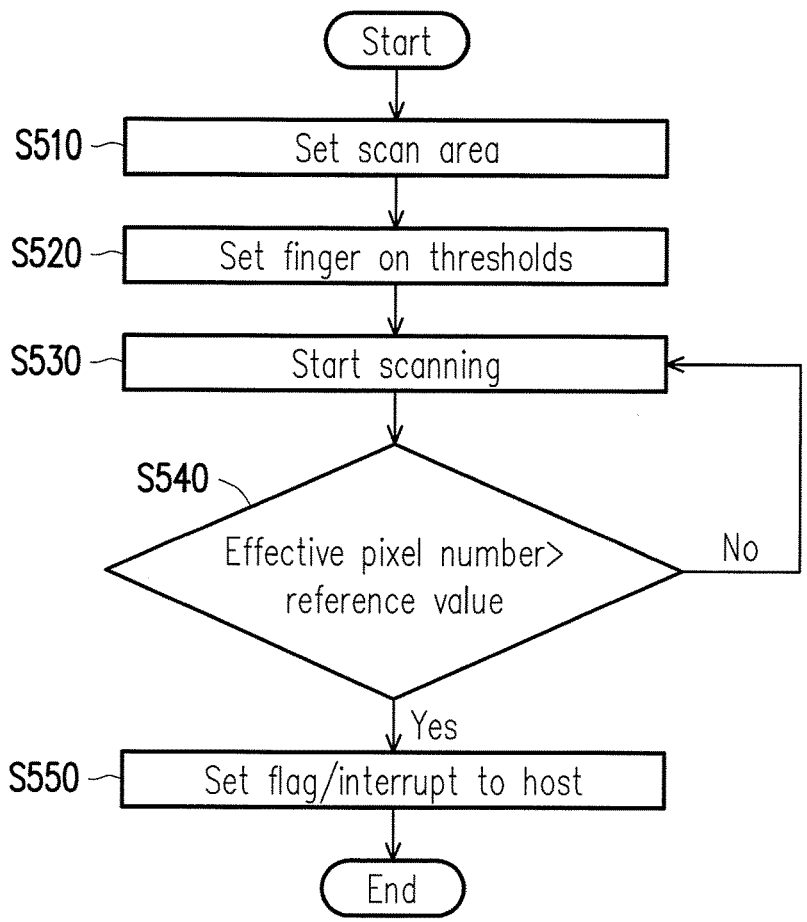
FIG. 5 illustrates a flow chart of a finger print detection method according to another embodiment of present disclosure.

Please refer to FIG. 5, FIG. 5 illustrates a flow chart of a finger print detection method according to another embodiment of present disclosure. In FIG. 5, a scan area is set in a step S510, and finger on thresholds are set in a step S520. In the step S520, an upper threshold value and a lower threshold value are set for setting the finger on thresholds, and a gray level range may be obtain by the upper threshold value and the lower threshold value. Wherein, a relationship between the maximum gray level, the upper threshold value, the lower threshold value, and the minimum gray level is the maximum gray level>the upper threshold value>the lower threshold value>the minimum gray level.

Then, a scanning operation on each of a plurality of input images can be started in a step S530. By scanning a checked image of each of the input images, a total pixel number within the gray level range can be determined. By setting the total pixel number within the gray level range to be an effective pixel number, the effective pixel number can be compared with a reference value in a step S540, wherein the reference value may be generated by multiplying a total pixel number of the checked image and a preset ratio. If a compare result of the step S540 is false, the scanned input image is not a finger print, and the step S530 must be executed again. If the compare result of the step S540 is true, the scanned input image is a finger print, and a flag (or an interrupt) to a host can be set in a step S550. The host can activate an operation for accessing an entire finger print by processing the scanned input image according to the flag (or the interrupt).

Figure 6:
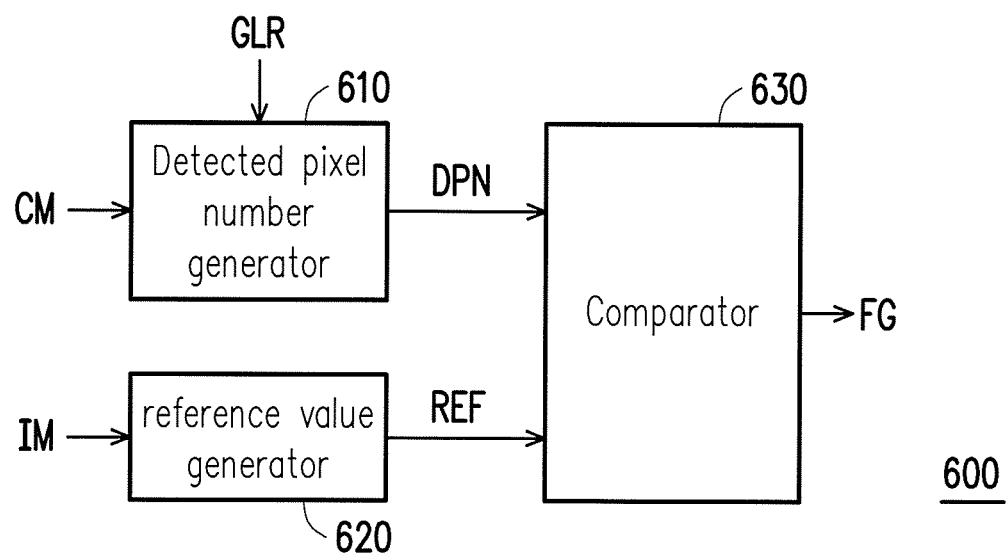
FIG. 6 illustrates a block diagram of a finger print detection apparatus according to an embodiment of present disclosure.

Please refer to FIG. 6, FIG. 6 illustrates a block diagram of a finger print detection apparatus according to an embodiment of present disclosure. The finger print detection apparatus 600 includes a detected pixel number generator 610, a reference value generator 620, and a comparator 630. The detected pixel number generator 610 accesses a part of an input image IM to generate a checked image CM and receiving a gray level range GLR, and obtains a detected pixel number DPN of the checked image CM corresponding to all of the gray levels within the gray level range GLR, wherein each of a gray level of the gray level rang GLR is larger than a minimum gray level and smaller than a maximum gray level. The reference value generator 620 generates a reference value REF by multiplying a preset ratio and a total pixel number of the checked image CM. The comparator 630 is coupled to the detected pixel number generator 610 and the reference value generator 620, and the comparator 630 compares the detected pixel number DPN and the reference value REF to generate a flag FG. Wherein the flag FG indicates whether the checked image CM is a finger print or not.

The detail operations of the detected pixel number generator 610, the reference value generator 620, and the comparator 630 can be seen in the previously embodiment mentioned above, and no more repeated descriptions here.

Figure 7:
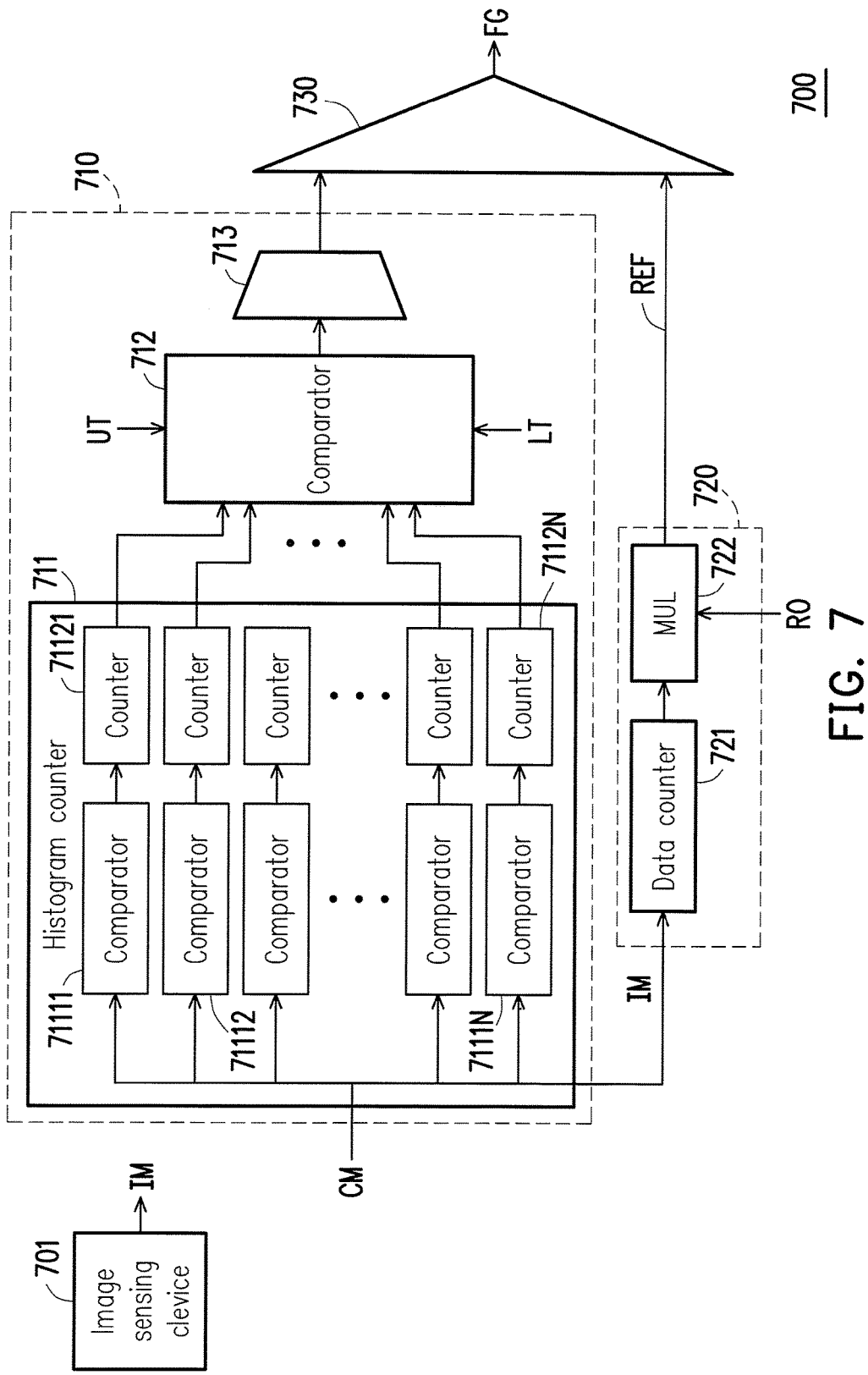
FIG. 7 illustrates a schematic diagram of a finger print detection apparatus according to another embodiment of present disclosure.

Please refer to FIG. 7, FIG. 7 illustrates a schematic diagram of a finger print detection apparatus according to another embodiment of present disclosure. The finger print detection apparatus 700 includes a detected pixel number generator 710, a reference value generator 720, and a comparator 730. The detected pixel number generator 710 includes a histogram counter 711, a comparator 712, and an adder 713.

The histogram counter 711 includes a plurality of comparators 71111-7111N and counters 71121-7112N. The comparators 71111-7111N are respectively coupled to the counters 71121-7112N, and all of the comparators 71111-7111N receives a checked image CM. The comparators 71111-7111N are respectively corresponding to a plurality gray levels, and each of the comparators 71111-7111N compares a gray level of each of the pixels in the checked image CM with a corresponding gray level. For example, if the comparator 71111 corresponds to the gray level 10, and a pixel with gray level 10 is received by the comparator 71111, the comparator 71111 may output a match information. On the contrary, if a pixel with gray level 8 (not 10) is received by the comparator 71111, the comparator 71111 may output a miss information. Such as that, the comparators 71111-7111N may separate the pixels of the checked image CM into a plurality of group respectively corresponding to the gray levels.

The counters 71121-7112N respectively receive compare results from the comparators 71111-7111N. Each of the counters 71121-7112N may increase a counting result by 1 when the match information is received, and keeps the counting result when the miss information is received. For the example mentioned above, if the pixel with gray level 10 is received by the comparator 71111, the corresponding counter 71121 may increases the counting result by 1. Such as that, each of the counters 71121-7112N generates each of the pixel numbers corresponding to each of the gray levels.

The counting results from the counters 71121-7112N may represent a histogram of the checked image CM. The counting values are fed to the comparator 712, and the comparator 712 further receives the gray level range by receiving an upper threshold value UT and a lower threshold value LT. The comparator 712 selects the counting results (pixel numbers) corresponding to the gray levels within the gray level range to generate a plurality of selected pixel numbers. The adder 713 receives the selected pixel numbers, and generates a detected pixel number DON by summing the selected pixel numbers.

The reference value generator 720 includes a data counter 721 and a multiplier 722. The data counter 721 may receive an input image IM, and counting a total pixel number of the input image IM. The multiplier 722 is coupled to the data counter 721, and multiplying the preset ratio RO and the total pixel number of the input image IM to generate the reference value REF.

The comparator 730 is coupled to the adder 713 and the multiplier 722, receives the detected pixel number DPN and the reference value REF, and compares the detected pixel number DPN and the reference value REF to generate a flag FG. The flag FG may be used to activate an operation for accessing an entire finger print by processing the input image IM.

Furthermore, in present embodiment, the input image IM may be sensed by an image sensing device 701. The image sensing device 701 is coupled to the detected pixel number generator 710 and the reference value generator 720. The image sensing device 701 senses an image to obtain the input image IM, and obtains the checked image CM according to a scan area. The image sensing device 701 may be a CMOS sensor, or a CCD sensor, and may be disposed on a chip which includes the finger print detecting apparatus 700.

To conclude, in the present disclosure, a part of input image is provided to be scanned for finger print detection. The operation of the finger print detection can be simplified and a power consumption for the finger print detection can be reduced. Furthermore, only the detected pixel number of the checked image corresponding to all of the gray levels within the gray level range needs to be determined, and a circuit structure for operating the finger print detection can be simplified, too. A cost efficiency of the finger print detection apparatus can be improved accordingly.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A finger print detection method, comprising:
    accessing a part of an input image to generate a checked image;
    summing pixel numbers of pixels having gray levels larger than a smallest gray level out of all gray levels in all pixels and smaller than a largest gray level out of all gray levels in all pixels in the checked image to obtain a detected pixel number; and
    determining the checked image is a finger print when the detected pixel number is larger than a reference value.

2. The finger print detection method according to claim 1, wherein step of summing pixel numbers of pixels having gray levels larger than the smallest gray level out of all gray levels in all pixels and smaller than the largest gray level out of all gray levels in all pixels in the checked image to obtain the detected pixel number comprises:
    obtaining a histogram of a plurality of pixel numbers of the checked image corresponding to the all gray levels;
    selecting the pixel numbers of pixels which are having gray levels larger than the smallest gray level and smaller than the largest gray level to generate a plurality of selected pixel numbers; and
    summing the selected pixel numbers to generate the detected pixel number.

3. The finger print detection method according to claim 1, further comprising:
    sensing an image to obtain the input image; and
    setting a scan area on the image, and obtaining the checked image according to the scan area.

4. The finger print detection method according to claim 3, wherein a size of the scan area is not larger than a size of the input image.

5. The finger print detection method according to claim 3, wherein the scan area comprises at least one scan window.

6. The finger print detection method according to claim 1, further comprising:
    setting a flag if the checked image is determined to be the finger print; and
    activating an operation for accessing an entire finger print by processing the input image.

7. The finger print detection method according to claim 1, wherein the reference value equals to a product value of a preset ratio and a total pixel number of the checked image, wherein the preset ratio equals to 1/2.

8. A finger print detecting apparatus, comprising:
    a detected pixel number generator, accessing a part of an input image to generate a checked image, and obtaining a detected pixel number of the checked image by summing pixel numbers of pixels having gray levels larger than a smallest gray level out of all gray levels in all pixels and smaller than a largest gray level out of all gray levels in all pixels in the checked image;
    a reference value generator, generating a reference value by multiplying a preset ratio and a total pixel number of the checked image;
    a first comparator, coupled to the detected pixel number generator and the reference value generator, and comparing the detected pixel number and the reference value to determine whether the checked image is a finger print or not,
    wherein, if the detected pixel number is larger than the reference value, the checked image is determined to be the finger print by the first comparator.

9. The finger print detecting apparatus according to claim 8, wherein the detected pixel number generator comprises:
    a histogram counter, receiving the checked image, counting a plurality of pixel numbers respectively corresponding to a plurality of gray levels;
    a second comparator, coupled to the histogram counter, receiving the pixel numbers, and selecting the pixel numbers of pixels which are having gray levels larger than the smallest gray level out of all gray levels in all pixels and smaller than the largest gray level out of all gray levels in all pixels in the checked image to generate a plurality of selected pixel numbers; and
    an adder, coupled to the second comparator, receiving the selected pixel numbers, and summing the selected pixel numbers to generate the detected pixel number.

10. The finger print detecting apparatus according to claim 9, wherein the histogram counter comprises:
    a plurality of third comparators, receiving the checked image and separating a plurality of pixels of the checked image into a plurality of groups respectively corresponding to the all gray levels; and
    a plurality of counters, respectively coupled to the plurality of third comparators, wherein each of the plurality of counters generates each of the pixel numbers corresponding to each of the all gray levels.

11. The finger print detecting apparatus according to claim 9, wherein the reference value generator comprises:
    a data counter, receiving the checked image and counting the total pixel number of the input image; and
    a multiplier, coupled to the data counter, and multiplying the preset ratio and the total pixel number of the input image to generate the reference value.

12. The finger print detecting apparatus according to claim 8, further comprising:
    an image sensing device, coupled to the detected pixel number generator, sensing an image to obtain an input image, and obtaining the checked image according to a scan area.

13. The finger print detecting apparatus according to claim 12, wherein a size of the scan area is not larger than a size of the input image.

14. The finger print detecting apparatus according to claim 12, wherein the scan area comprises at least one scan window.

15. The finger print detecting apparatus according to claim 8, wherein the first comparator generates an output signal, and the output signal is used to set a flag if the checked image is determined to be the finger print, wherein, an operation for accessing an entire finger print by processing the input image is activated according to the flag.

16. The finger print detecting apparatus according to claim 8, wherein the preset ratio equals to 1/2.

\* \* \* \* \*